P. ROBINSON.
Lard Lamp.
No. 2,873.
Patented Dec. 5, 1842.
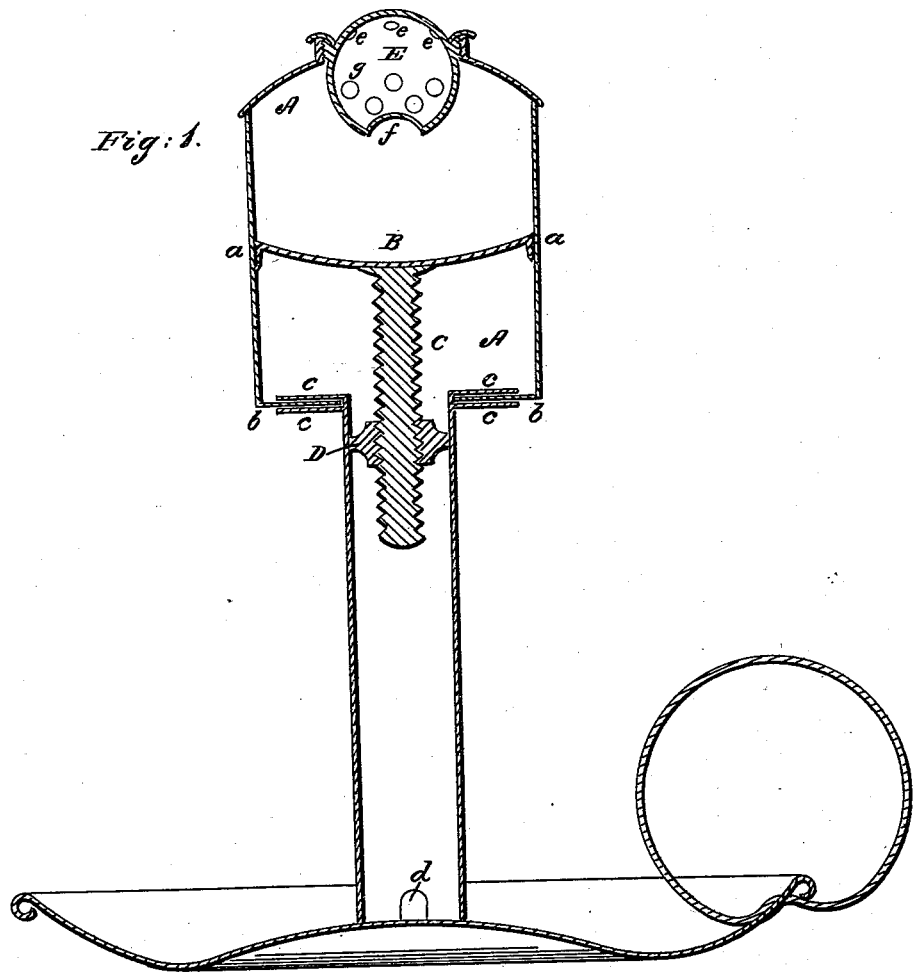
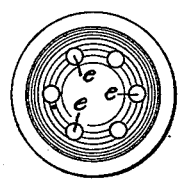
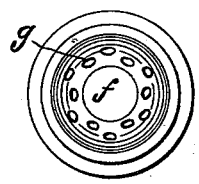
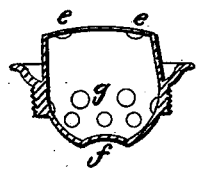

UNITED STATES PATENT OFFICE.

P. ROBINSON, OF CHILLICOTHE, OHIO.

LARD-LAMP.

Specification of Letters Patent No. 2,873, dated December 5, 1842.

*To all whom it may concern:*

Be it known that I, P. ROBINSON, of Chillicothe, in the county of Ross and State of Ohio, have invented an Improvement in the Manner of Constructing a Lamp for the Burning of Lard and other Oleaginous or Concrete Fatty Substances; and I do hereby declare that the following is a full and exact description thereof.

In the accompanying drawing, Figure 1, is a vertical section through the axis of my lamp.

A, A, is the body, or receptacle, for the lard, &c.

B, is a cup, or piston, filling the area of the receptacle, which is cylindrical. Around the edge, or periphery, a, a, of the cup, or piston, I wind cotton, flax, tow or other material that will not be injured by heat, instead of using leather, which is frequently rendered useless by placing the lamp near the fire.

C, is a screw attached to the bottom of the cup, or piston, and passing through a nut D, in the tubular support E, of the lamp. The body A, is made to rotate by allowing its bottom b, b, which is perforated for that purpose, to be embraced between two plates of metal c, c, which are soldered to the upper end of the tubular support. Should any leakage take place around the cup B, the material when warmed may be allowed to run down through openings around the nut D, and to pass out at an aperture d, left for that purpose.

My principal improvement in this lamp consists in the manner in which I form the wick holder, or burner, E. The body of this I usually make in the form of a globe, or nearly so; this globe, which is hollow, is shown in section in Fig. 1; and Fig. 2, is a top, and Fig. 3, a bottom view of it. This burner screws into the top of the lamp, in the usual manner. On its upper side, it has six, or any preferred number of small openings, e, e, e, say of an eighth of an inch in diameter; and on its under side, it has one large central opening, f, exceeding in its area that of the sum of the openings on the upper side; there are, also, a number of small openings, as shown at g, g, on the lower side, surrounding the larger opening f. The small openings on the upper side may have short tubes inserted within them to receive the small wicks which are to be passed through them. It is not essential to the operation of the lamp, that the wick-holder should be globular, although I prefer this form. In Fig. 4, I have shown it as rising cylindrically from its screw ferrule, with the upper part, in which are the perforations e, e, nearly flat.

The wick is to be put into this lamp in small strands, adapted to the openings e, e, in the upper part of the burner, and these strands are to pass together through the large opening f, on its under side. They may be very readily inserted by means of a large needle, or of a small bodkin, passed alternately through one of the smaller, and through the larger hole, until all the smaller holes have been filled. The holes g, g, are made for the admission of the lard from the body of the lamp into the interior of the burner; and when the cup, or piston, is forced up, for that purpose, there is not the slightest tendency to produce a disarrangement of the wicks either in the larger, or in the smaller holes. It is not necessary to employ a guide piece to cause the piston to revolve with the body of the lamp, as its friction on the inside of the cylinder, being much greater than that of the screw in its nut, will always cause it so to revolve, unless it be forced against the top, or the bottom, when the cylindrical body will revolve around it, so that no overforcing can take place. I have used such a lamp without having tubes inserted in the smaller holes; but, for the convenience of raising the wicks, such tubes are to be preferred.

Having thus, fully described the manner in which I construct my improved lard lamp, what I claim therein as new, and desire to secure by Letters Patent, is—

The so constructing the burner of such a lamp, as to admit of the inserting of a number of small wicks through a series of openings in the upper side of such burner, and the passing of said wicks, collectively, through a larger hole, adapted thereto, in its lower side; there being, also, a number of small holes perforated in the lower side of the burner for the admission of the lard, or other fatty matter; the whole being constructed and operating substantially as herein set forth.

The advantage derived from the foregoing arrangement of the burner is the perfect combustion of the burning fluid, in consequence of the smallness of the wicks, and the free admission of atmospheric air around them, by which a remarkably clear, white light is produced, and the tendency to smoke is nearly destroyed.

P. ROBINSON.

Witnesses:
  THOS. P. JONES,
  EDWIN L. BRUNDAGE.